United States Patent [19]
Chopping

[11] Patent Number: 5,636,260
[45] Date of Patent: Jun. 3, 1997

[54] TELECOMMUNICATION CUSTOMER INTERFACE

[75] Inventor: Geoffrey Chopping, Wimborne, Great Britain

[73] Assignee: GPT Limited, United Kingdom

[21] Appl. No.: 411,538

[22] Filed: Mar. 28, 1995

[30] Foreign Application Priority Data

Mar. 29, 1994 [GB] United Kingdom ............... 9406212

[51] Int. Cl.$^6$ ............... H04M 3/08; H04M 3/22
[52] U.S. Cl. ................... 379/5; 379/10; 379/15; 379/29
[58] Field of Search ............... 379/1, 5, 9, 10, 379/15, 27, 22, 29, 21; 370/13–15

[56] References Cited

U.S. PATENT DOCUMENTS

| | | | |
|---|---|---|---|
| 4,560,842 | 12/1985 | Homer | 379/5 |
| 4,575,584 | 3/1986 | Smith | 379/2 |
| 4,670,898 | 6/1987 | Pierce | 379/22 |
| 4,766,594 | 8/1988 | Ogawa | 379/5 |
| 4,984,262 | 1/1991 | Kumozaki | 379/27 |
| 5,224,149 | 6/1993 | Garcia | 379/10 |
| 5,251,204 | 10/1993 | Izawa | 379/15 |
| 5,343,461 | 8/1994 | Barton | 379/1 |
| 5,359,646 | 10/1994 | Johnson | 379/27 |
| 5,361,293 | 11/1994 | Czerwiec | 379/27 |
| 5,490,199 | 2/1996 | Fuller | 379/1 |

FOREIGN PATENT DOCUMENTS

| | | |
|---|---|---|
| 15383/76 | 1/1978 | Australia . |
| 0202648A2 | 5/1985 | European Pat. Off. . |
| 0208327A1 | 7/1985 | European Pat. Off. . |
| 0202648A2 | 11/1986 | European Pat. Off. . |
| 0618714A1 | 10/1994 | European Pat. Off. . |
| 3135561A1 | 9/1981 | Germany . |
| 2141606 | 12/1984 | United Kingdom . |
| 2158326 | 11/1985 | United Kingdom . |

OTHER PUBLICATIONS

"*Ein neuer Standard verändert die Welt*", Synhrone Digitale Hierarcie, pp. 56–59 and 62, Funkschau 14, 1991.

*Primary Examiner*—Curtis Kuntz
*Assistant Examiner*—Vijay Shankar
*Attorney, Agent, or Firm*—Kirschstein, et al.

[57] ABSTRACT

A telecommunication network and switching system where digital circuits are supplied to customer terminals for dial-up services and where automatic testing of the access connections to the customer premises is performed while calls are not in progress. A loop test unit is provided at the customer's premises near to the customer digital line terminals able to detect a test sequence sent from an exchange when a call is not in progress, the test sequence being recognized by the loop test unit and a test sequence being returned to the exchange to enable the error performance of the link in both directions to be tested.

5 Claims, 3 Drawing Sheets

TELECOMMUNICATION CUSTOMER INTERFACE

BACKGROUND OF THE INVENTION

Field of the Invention

Dial-up telecommunication services have been principally concerned with providing low bandwidth circuits between subscribers that are capable of carrying speech. Non dial-up telecommunications services have been provided as permanent private circuits at various bandwidths. Many of these private circuits consist of digital bit streams. Because the data carried by many of these digital private circuits is supplied by the customer, the operator of the telecommunication service does not have any control over the data transported and therefore may have no opportunity for routinely inserting known data formats in order to ensure that the bit streams are being correctly transported.

Although new multiplexing techniques often carry extra data in order to enable suitable performance measuring to be performed; these multiplexing techniques are often not suitable on certain parts of networks and in particular on the access interfaces to the subscriber's premises.

The introduction of digital dial-up services enables methods to be employed in telecommunication access networks to ensure the satisfactory performance monitoring of the digital circuits.

SUMMARY OF THE INVENTIONS

According to the present invention there is provided a telecommunications network and switching system offering dial-up switched services comprising:

an exchange including call control means and a service switch with exchange digital line terminations;

access links to customers for both digital circuits and signalling means;

a loop test unit at the customer's premises near to the customer digital line terminals;

and wherein means is provided to determine when no call is in progress on an transmission access link in order that the exchange digital line termination may transmit over that link a standard test sequence recognizable by the loop test unit so that a composite test sequence may be returned from the loop test unit to the same exchange digital line termination so as to enable the error performance of both directions of the link to be determined by that exchange digital line termination.

BRIEF DESCRIPTION OF THE DRAWINGS

The present invention will now be described by way of example by reference to the accompanying drawings in which.

DESCRIPTION OF THE PREFERRED EMBODIMENTS

These figures and the following description are based on primary rate 2048 kbit/s transmission although the technique is applicable to other rates of transmission.

Figure 1:
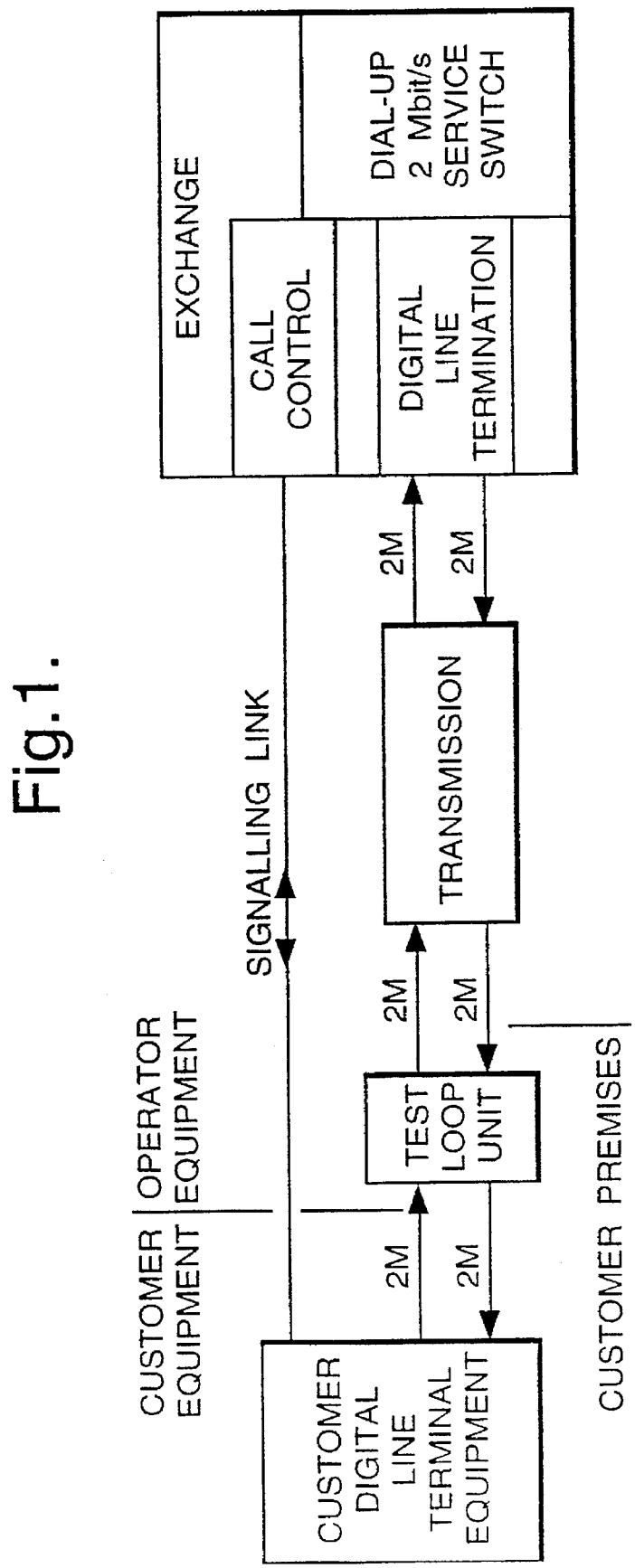
FIG. 1 shows a diagrammatic representation of a transmission link and a signalling link from the exchange to the subscriber's digital line terminal.

Referring now to FIG. 1 the transmission arrangements consist of a signalling link and a 2048 kbit/s link herein referred to as a 2 Mbit/s link. When the 2 Mbit/s link is carrying customer traffic it may be using one of many possible types of format. Unlike a permanent private circuit which can be carrying continuous customer traffic; a 2 Mbit/s dial-up service link is not always carrying customer traffic.

An ordinary subscriber low bandwidth analogue copper pair is in a reduced power state when not in use; a 2 Mbit/s line normally stays fully powered even when not carrying useful customer traffic. Consequently for a dial-up 2 Mbit/s service the link regularly has no call in progress.

For an ordinary analogue call if a subscriber believes that an established call has subsequently become disconnected or the quality of the connection is too bad then the subscriber can ring off in order to clear the call. Similarly if during a 2 Mbit/s call the subscriber equipment detects that the link is no longer operating satisfactorily the subscriber equipment may initiate the clear via the parallel signalling link. The means for operating a parallel signalling link is described in patent application no. GB 9319449.6 imported herein by reference. Whenever a clear is actioned the result is that there is no call in progress. Therefore there is an opportunity to test the 2 Mbit/s circuit from the exchange through to the subscriber's premises while there is no call in progress.

Once the call control function has determined that there is no call in progress the exchange digital line termination can be instructed to continuously insert a defined test sequence.

Figure 2:
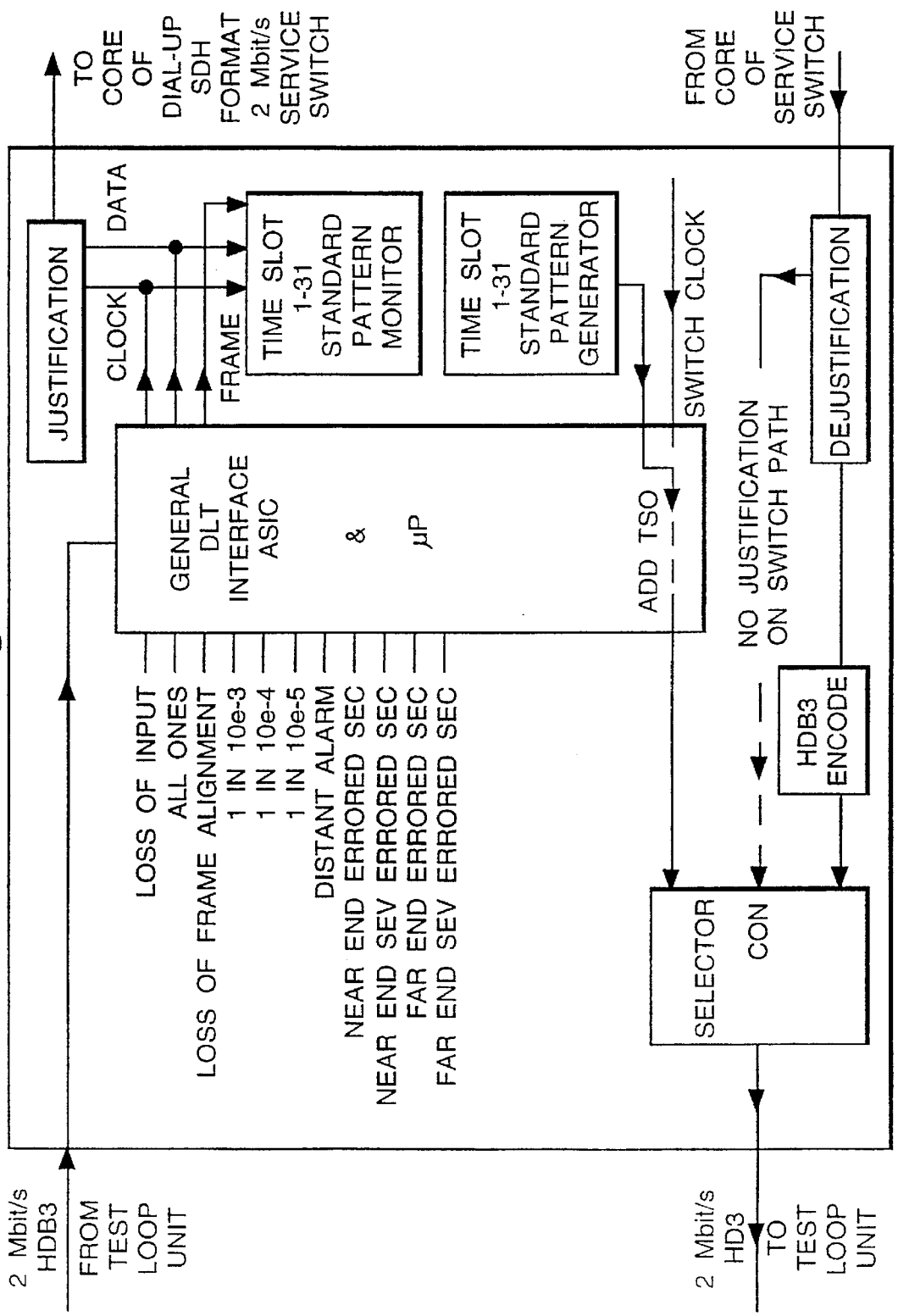
FIG. 2 shows a diagrammatic representation of an exchange digital line termination with means for test pattern insertion and for test pattern monitoring.

Referring now to FIG. 2 a means by which call control can indicate to the exchange digital line termination that there is no call in progress is by clearing a path across the digital switch providing that the resultant idle pattern from the switch can be clearly distinguished from normal data when a path is established. An example of such a case is when recognizable Synchronous Digital Hierarchy (SDH) formats are carried by the switch when a path is established and the idle patterns are chosen so that they cannot imitate the SDH formats.

A formatted test sequence based on a G.704 format of 32 time slots with a 4 bit cyclic redundancy (CRC-4) check comprises:

a time slot zero containing a frame alignment signal as well as a CRC-4 multiframe and correct CRC-4 check sums for the transmitted data;

a further 31 time slots containing standard and recognisable patterns.

Figure 3:
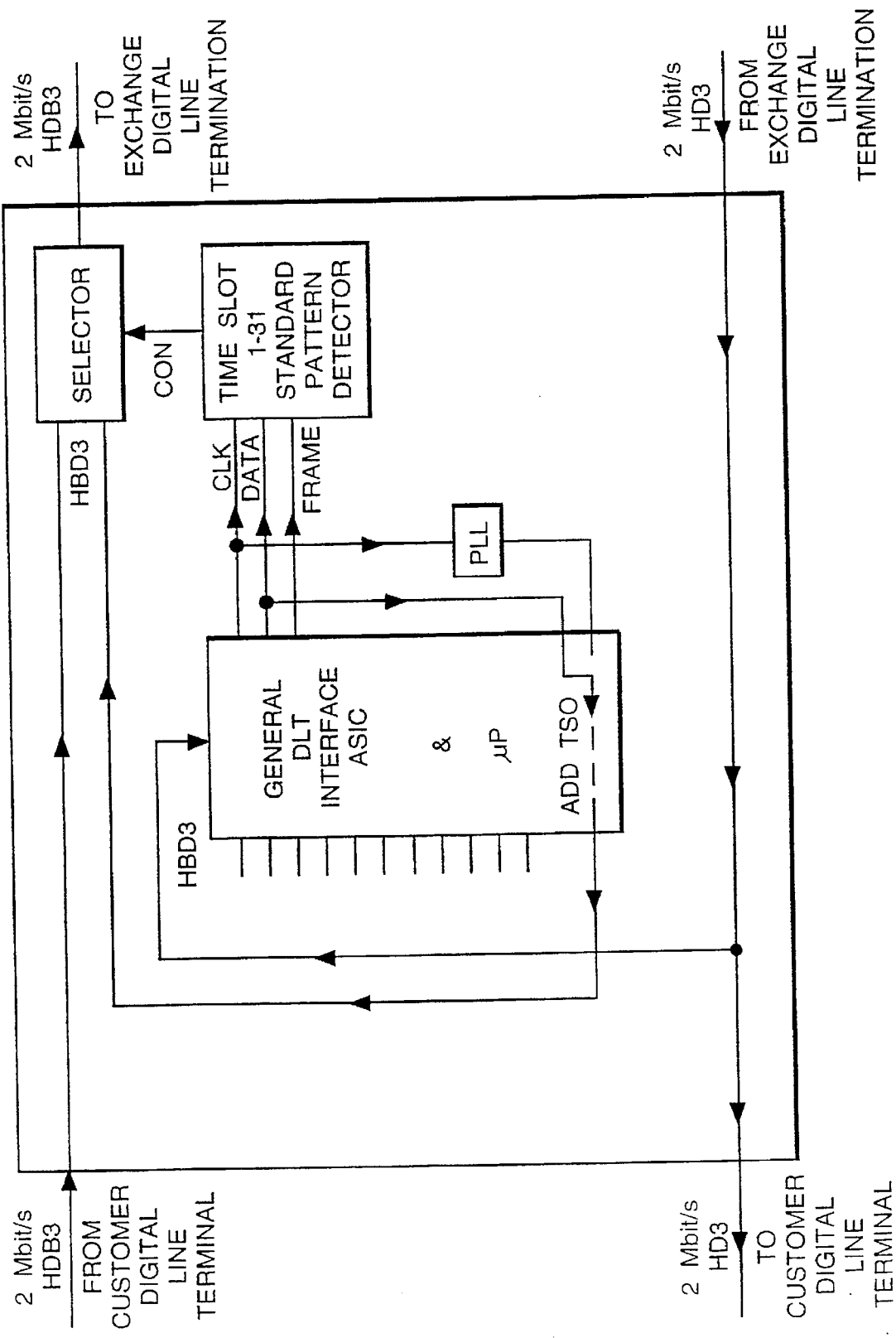
FIG. 3 shows a diagrammatic representation of a test loop unit with means of providing a test loop and for test pattern monitoring.

Referring now to FIG. 3 a test loop unit functions as part of the access network and is not part of the subscriber's digital line terminal, though it is appropriate to site a test loop unit at the customer's premises. A test loop unit contains means for recognizing the test sequence that has been inserted by the exchange digital line termination. When the test loop unit has been continuously receiving the test sequence for longer than a defined period of time the test loop unit replaces the digital stream from the subscriber's digital line terminal with the test sequence from the exchange digital line termination except that the time slot zero contains a new frame alignment signal as well as a CRC-4 multiframe and correct CRC-4 check sums for the transmitted data. Also included in the time slot zero are any remote alarm indications signal and CRC-4 error indication bits relating to the 2 Mbit/s interface received by the test loop unit from the exchange digital line termination.

From the received time slot information including the remote alarm indication signal as well as the CRC-4 bits and the CRC-4 error bits, the exchange digital line termination can determine the error performance of both directions of transmission of the link from the exchange digital line termination as far as the loop test unit at the subscribers premises.

I claim:

1. In a dial-up telecommunications network of a type including an exchange; a plurality of customer line terminations; respective access links connecting each customer line termination to the exchange, and respective signaling links connecting the customer line termination to the exchange, said access links being operative to carry data, and said signaling links being physically separate from the access links and being operative to provide signaling between the customer line termination and the exchange;

an access link test apparatus for testing said access links, said access link test apparatus comprising:
 a) means for determining when no call is in progress on an access link to be tested;
 b) means being operative whenever no call is in progress for transmitting a known test sequence over the access link to be tested to the customer line termination;
 c) a loop test unit connected to the access link to be tested, said loop test unit being located near to a customer's line termination, said loop test unit being operative upon detecting the known test sequence to generate a composite test sequence and transmit the composite test sequence over the access link to be tested to said exchange; and
 d) means for analyzing the composite test sequence received at the exchange, thereby enabling both directions of the access link being tested to be checked.

2. The access link test apparatus as claimed in claim 1, wherein the access link to be tested has a primary rate of 2048 kbit/s.

3. The access link test apparatus as claimed in claim 1, wherein the means for determining when no call is in progress is operative to clear a switch path across a service switch of the exchange when it determines that no call is in progress, and is further operative for providing the known test sequence which is an idle pattern which is selected to be significantly different in format from a normal internal switch traffic format.

4. The access link test apparatus as claimed in claim 3, wherein the normal internal switch traffic format includes synchronous digital hierarchy (SDH) virtual containers.

5. The access link test apparatus as claimed in claim 4, wherein the known test sequence is based on a 2048 kbit/s frame format.

* * * * *